United States Patent Office 3,558,756
Patented Jan. 26, 1971

3,558,756
PROCESS OF MAKING GELATIN WOOL FILTER
Clifton Aldridge, Jr., Creve Coeur, and Robert D. Howell, Ellisville, Mo., assignors to McDonnell Douglas Corporation, St. Louis, Mo., a corporation of Maryland
No Drawing. Filed Mar. 4, 1969, Ser. No. 804,291
Int. Cl. B01d 39/16
U.S. Cl. 264—101     7 Claims

ABSTRACT OF THE DISCLOSURE

A gelatin wool filter comprising gelatin fibers naturally arranged in a filter pad for filtering up to about 99% of particles of 0.3 micron and larger, said filter being soluble in water. The process includes the steps of dissolving gelatin in water, adding to alcohol, drying, forming into a filter and gas sterilizing.

BACKGROUND OF THE INVENTION

In bacteriological work it is desirable to have a water soluble filter and it is essential to provide a filter which can be sterilized and which has small enough openings to collect the small particles which are found in air. These may be viable or non-viable. It also is desirable that large volumes of air can be passed through the filter per unit of time to facilitate filtering of larger areas. Heretofore no soluble filter has been found which meets all of the other requirements.

SUMMARY OF THE INVENTION

The present invention comprises a soluble bacteriological filter of gelatin wool filbers suitable for filtering large volumes of air and removing particles of 0.3 micron and larger in size. The present invention further comprises a process of making said filter by precipitating gelatin wool in alcohol from a gelatin-water solution, drying, and sterilizing the wool.

SPECIFIC EXAMPLE

Fifteen (15) grams of bacteriological grade gelatin is dissolved in 100 milliliters of distilled water at 37–40° C. This solution is dropped slowly into 95% alcohol (ethanol) with constant agitation. The amount of alcohol is 500 ml. alcohol/10 ml. of gelatin solution. The gelatin precipitates out as "wool." This is allowed to stand for five minutes after the gelatin addition has been completed to permit adequate absorption of water by the alcohol. The excess alcohol is decanted off and the wool is placed into a vacuum chamber immediately. A vacuum of 5 microns in mercury is drawn on the chamber and the wool is kept in the chamber for 24 hours until it dries. The dried wool is removed, formed into a filter and treated with a mixture of 12% ethylene oxide and 88% Freon 12 to sterilize the wool. The sterilizing gas treatment lasts for 24 at ambient temperature. The filter is then introduced into an air conduit of a "clean room" of an aero space manufacturer and removes particles of 0.30 micron and larger in size while passing the volumes of air necessary to adequately ventilate the room. A filter of 1.0 inch thickness will pass 0.025 cubic feet of air/second/ square inch of surface area. The gelatin wool filter is dissolved in water of 39° C. to facilitate assay for viable and non-viable particles.

DETAILED DESCRIPTION

The gelatin used is readily available commercially and preferably is bacteriological grade. From about 10 to about 20%, preferably 15% gelatin is mixed with water at a temperature of about 35 to 53° C., preferably 37–40° C. The alcohol is 95% ethanol or propanol. The ratio of alcohol to gelatin solution varies from about 350 ml. to about 500 ml. alcohol/10 ml. gelatin solution. The gelatin solution is at a temperature of 35 to about 53° C. when it is added to the alcohol which is at a temperature of about 35 to about 40° C. The gelatin which precipitates is of 5 to about 100 cm. length and about 200 to 500 microns diameter. The wool prior to entering the vacuum is at a moisture level of about 5 to about 10%. The vacuum drawn is about 5 to about 10 microns of mercury. The gelatin wool when dried has a moisture content of about 1 to about 3%. The time of vacuum treatment can vary from about 36 to about 72 hours.

The sterilization can be any suitable gas technique or other technique which does not result in dissolving the gelatin or disarranging the wool structure. Preferably the gelatin is sterilized using an ethylene oxide-Freon 12 mixture for from about 24 to about 48 hours. The mixture contains about 11 to about 12% ethylene oxide by weight and about 88 to about 89% Freon 12. Freon 12 is a trademark of DuPont and is dichlorodifluoromethane.

The gelatin wool filter itself has a density of 500 to 600 gms./cu. ft. and has a porosity of 0.6 to 0.3 micron. It is 1 to 2 inches thick and must trap at least 99.99% of particles of 0.3 micron or greater in size. It must pass at least 216 cu. ft. of air/minute per sq. ft. of surface area.

Thus it is seen that the present invention achieves all of the objects and advantages sought therefor. This invention is intended to cover all changes and modifications of the example of the invention herein chosen for purposes of the disclosure which do not constitute departures from the spirit and scope of the invention.

What is claimed is:
1. A method of making a gelatin wool filter including the steps of
 (a) a dissolving gelatin in water,
 (b) depositing said solution in an alcohol selected from the group consisting of ethanol and propanol which is about 95% pure,
 (c) dryng the precipitate to a moisture content of less than about 3%,
 (d) forming the wool into a filter which permits about 1.3 to about 1.5 cu. ft. of air to pass/minute/square inch of surface area, and
 (e) sterilizing the filter.
2. The process of claim 1 wherein about 10 to about 20% gelatin is dissolved in water.
3. The process of claim 2 wherein the gelatin-water solution is deposited into the alcohol in a ratio of 10 ml. solution/about 350 to about 500 ml. alcohol.
4. The process of claim 1 wherein the precipitate is dried under a vacuum of about 5 to about 10 microns of mercury for about 36 to about 72 hours.
5. The process of claim 1 wherein the wool filter is about 500 to about 600 gms./cubic ft.$^3$ density and about 1 to about 2 inches thick.

6. The process of claim 1 wherein the filter is sterilized with a sterilizing gas composed of about 11 to about 12% by wt. ethylene oxide and about 89 to 88% Freon 12.

7. The process of claim 1 wherein about 10 to about 20% gelatin is dissolved in water, the gelatin water solution is deposited into the alcohol in a ratio of 350 to 500 ml. 95% alcohol/10 ml. solution, the resulting precipitate is dried under a vacuum of 5 to 10 microns of mercury for 36 to 72 hours, the dried wool is formed into a filter of 500 gms. to 600 gms./ft.$^3$ density and 1 to 2 inches thick, and the filter is sterilized with a sterilizing gas composed of 11 to 12% by wt. ethylene oxide and 89 to 88% Freon 12.

References Cited

UNITED STATES PATENTS

| 2,126,305 | 8/1938 | Babcock | 106—135 |
| 2,704,269 | 3/1955 | Tice | 99—130 |
| 3,269,851 | 8/1966 | Tu | 106—125 |
| 3,393,080 | 7/1968 | Erdi et al. | 106—161 |

ROBERT F. WHITE, Primary Examiner

G. AUVILLE, Assistant Examiner

U.S. Cl. X.R.

55—528; 106—125; 264—203, 232